US007640066B2

(12) United States Patent (10) Patent No.: US 7,640,066 B2
Rayburn et al. (45) Date of Patent: Dec. 29, 2009

(54) TRANSPORT OF ENCAPSULATED SERIAL DATA VIA INSTANT MESSAGING COMMUNICATION

(75) Inventors: Ronald Richard Rayburn, Norman, OK (US); Charles Lynn Crawford, Norman, OK (US)

(73) Assignee: York International Corporation, York, PA (US)

( * ) Notice: Subject to any disclaimer, the term of this patent is extended or adjusted under 35 U.S.C. 154(b) by 995 days.

(21) Appl. No.: 10/772,620

(22) Filed: Feb. 5, 2004

(65) Prior Publication Data

US 2005/0188076 A1 Aug. 25, 2005

(51) Int. Cl.
*G05B 15/02* (2006.01)
*G05B 23/02* (2006.01)
*G05B 19/18* (2006.01)
*G05B 11/01* (2006.01)
*G05B 15/00* (2006.01)
*G01B 3/00* (2006.01)
*G01B 5/00* (2006.01)
*G06F 11/00* (2006.01)

(52) U.S. Cl. .............................. 700/17; 700/9; 700/83; 340/3.1; 702/33; 702/188

(58) Field of Classification Search ............ 700/17–20, 700/83, 9; 340/3.1; 702/33, 188
See application file for complete search history.

(56) References Cited

U.S. PATENT DOCUMENTS 4,380,009 A 4/1983 Long et al.
4,551,832 A 11/1985 Carll et al.

(Continued)

FOREIGN PATENT DOCUMENTS

WO    WO 99/57837    11/1999

(Continued)

OTHER PUBLICATIONS

Instant Message; Wikipedia's description; 10 pages.*

(Continued)

*Primary Examiner*—Ronald D Hartman, Jr.
(74) *Attorney, Agent, or Firm*—McNees Wallace & Nurick LLC (57) ABSTRACT

A method and system is provided for gathering and packetizing data from networked building automation equipment, and for transmitting data packets as instant messages to remotely located users. An instant messaging (IM) server-based system is provided to facilitate communication between networked building equipment and a remotely located service contractor. When a registered router is operated, the router establishes a continuous pass-through communication link with the IM server and with building equipment connected to the router. The router automatically polls connected building equipment for alarms, faults and system failures, and also receives, processes, and responds to user requests for specific data from particular items of building equipment. Data gathered by the router is packetized, and the packets are then encapsulated into an instant message that is transmitted to the IM server. Authorized users who log on to the IM server are then provided access to the instant message containing the packetized data. Additionally, remote users can solicit gathering of data by the router by submitting to an IM server an instant message requesting the router to gather and return specific data from particular item of building equipment.

22 Claims, 3 Drawing Sheets

U.S. PATENT DOCUMENTS

| | | | |
|---|---|---|---|
| 5,390,206 A | 2/1995 | Rein et al. | |
| 5,737,318 A | 4/1998 | Melnik | |
| 5,751,572 A | 5/1998 | Maciulewicz | |
| 6,400,265 B1* | 6/2002 | Saylor et al. | 340/531 |
| 6,421,354 B1 | 7/2002 | Godlewski | |
| 6,529,590 B1 | 3/2003 | Centers | |
| 6,542,076 B1 | 4/2003 | Joao | |
| 6,545,601 B1 | 4/2003 | Monroe | |
| 7,310,344 B1* | 12/2007 | Sue | 370/410 |
| 2001/0036192 A1 | 11/2001 | Chiles et al. | |
| 2002/0002627 A1* | 1/2002 | Stead et al. | 709/250 |
| 2002/0019725 A1* | 2/2002 | Petite | 702/188 |
| 2002/0069276 A1* | 6/2002 | Hino et al. | 709/223 |
| 2002/0163447 A1 | 11/2002 | Runyon et al. | |
| 2003/0106062 A1* | 6/2003 | Shteyn et al. | 725/78 |
| 2003/0117280 A1* | 6/2003 | Prehn | 340/540 |
| 2003/0233429 A1* | 12/2003 | Matte et al. | 709/221 |
| 2004/0103153 A1* | 5/2004 | Chang et al. | 709/206 |
| 2005/0198063 A1* | 9/2005 | Thomas et al. | 707/102 |

FOREIGN PATENT DOCUMENTS

| | | |
|---|---|---|
| WO | WO 01/78443 A2 | 10/2001 |
| WO | WO 03/019389 A1 | 3/2003 |
| WO | WO 03/025776 A1 | 3/2003 |

OTHER PUBLICATIONS

Encapsulation; Wikipedia's description; 2 pages.*
How Encapsulation Works; Wikipedia's description; 8 pages.*
Wikipedia's definition of "Encapsulation"; 2 pages; printed from Wikipedia.com on Mar. 16, 2009.*

* cited by examiner

TRANSPORT OF ENCAPSULATED SERIAL DATA VIA INSTANT MESSAGING COMMUNICATION

FIELD OF THE INVENTION

The present invention is directed to a system and method for the transport of electronic data and information from building automation system equipment to local and remotely located users. More particularly, this invention is directed to a system and method for providing building automation data and information from corresponding building equipment, such as HVAC equipment, to a remotely located user, such as a servicing contractor, using instant messaging ("IM") technology, software and services for monitoring of the building equipment by the remote user.

BACKGROUND OF THE INVENTION

Instant messaging software is widely used to enable a computer user to communicate electronically over a wide area network, such as the Internet, with other users. Typically, the instant messaging service is set up to alert a user or users whenever another authorized user is logged on to a server such as an Internet server—a capability known as "presence." The user creates a list of other authorized users that are of interest or importance to the user, and shares the list with the service. The server routinely and automatically scans all logged in users and determines when any other user on the user's list is logged onto the server or has otherwise established access to the service. When a listed user is located, the service allows the user to initiate a private chat or communication session with the listed user, and vice versa. Unlike electronic mail, IM is primarily used by subscribers to "chat" (exchange simple text messages in real-time or in near-real-time) with one or more other IM users. Users can communicate through IM using a computerized interface, such as a website or a dedicated IM Interface, that is accessible through the Internet using a PC, a PDA, a cell phone or other similar device or technique for accessing the Internet.

Instant messaging services constitute a widely used Internet application, and are offered by a growing number of Internet service providers. Popular legacy IM applications include America Online's Instant Messenger™ (trademarked and owned by America Online Inc.), Microsoft's Network Messenger™ (trademarked and owned by Microsoft Corporation), as well as Yahoo! Messenger™ (trademarked and owned by Yahoo! Corporation). However, many of these legacy IM applications are not compatible with each other, thus preventing IM communication between users running different IM software. As a result of this problem, open source IM software, such as Jabber™ (trademarked and owned by Jabber Software Foundation) is gaining popularity. Jabber™ is an open XML protocol for the real-time exchange of messages and presence between any two points on the Internet. The benefit of Jabber™ is that it allows users to send and receive IM messages from other users who are running different IM software or different operating systems, and also allows the transfer of files and receipt of headlines. Communication between Jabber™ users and users of legacy IM services is made possible by "gateways", and Jabber™ developers have created software that provides gateways to AOL Instant Messenger™, MSN Network Messenger™, and Yahoo! Messenger™. The availability of Jabber™ and similar flexible IM software or programs allows users of different IM software to instantly communicate with one another. As a result of Jabber's™ success, legacy IM system providers are now revising their IM software to make their services more compatible with other legacy IM systems.

To access a subscription IM service, a user accesses an instant messaging server through a communication network or means such as the Internet (or other appropriate wide area network), and usually provides a screen name and password or other form of identification to log in to or access the instant messaging server or IM network. Once a user has logged in to the appropriate IM server or network, his presence on the server or network is made known or available to all other IM users designated by the logged in user in the user's list (listed users are commonly referred to as "buddies"). Each user and buddy can then engage in typed conversations with other buddies connected to the IM server or system.

With particular reference to the non-subscription Jabber™ IM software, a first user can establish an account on a Jabber™ server (a server running Jabber™ software). The account is identified by a Jabber™ address (also known as a Jabber ID) that looks like an email address. For example, if the Jabber™ server is running or operating at locationone.com, the first user's Jabber™ ID can be user1@locationone.com. A second user can establish an account on a second Jabber™ server operating at locationtwo.com, the account can be identified by a Jabber™ ID unique to the second user's address on his chosen Jabber™ server, for example, user2@locationtwo.com. When the first user desires to send Jabber™ messages to the second user, the first user types a message on a computerized interface, and sends the message. The message is handled by the first Jabber™ server at locationone.com, which opens a network communication connection (such as an Internet connection) to the second Jabber™ server at locationtwo.com. The IM message is then routed as a server-to-server message across the connection to the second Jabber™ server at locationtwo.com. The second Jabber™ server at locationtwo.com reads the message's intended recipient address as user2@locationtwo.com, and delivers the message to that address, where it is opened and displayed on the second user's computerized interface. Jabber™ thus allows users of computerized interfaces based on different operating systems and IM programs to communicate through IM across multiple servers, so long as a communication channel can be opened between the computerized interfaces and the server(s). Obviously, Jabber™ and legacy IM services also permit users to communicate when the users are logged on to the same IM server. For example, two users can connect to a single IM server using PDAs, laptops, or other computerized interfaces that can establish a gateway connection to the IM server. In that case, the need for server to server communication is eliminated since the single IM server can simply route IM messages between the logged-on users to each user's computerized interface.

Because IM is a text-based service geared towards instant typed communication, IM communications are generally not used to transfer large files, such as, sound, graphic, image or program files. Additionally, the use of IM communication to request, access and retrieve data, such as equipment data from remotely located building equipment and automation systems, has not been heretofore realized or appreciated.

Accordingly, what is needed is a simple and efficient technique for providing building equipment and automation data and information to local and remotely located users.

SUMMARY OF THE INVENTION

The present invention provides a method of remotely monitoring building automation equipment having the steps of providing at least one item of building automation equipment communicably linked to a message router, the message router including a microprocessor executing computer-executable code for completing the steps of gathering of preselected data from the connected building equipment, packetizing of the data, encapsulating the packet into an instant message or text-based or ASCII-based message, and transmitting the instant message to an instant messaging server. The message router is communicably linked to an instant messaging server, and at least one remotely located computer interface is communicably linked to the instant messaging server. The method further involves assigning addresses to each item of building equipment connected to the router, assigning an instant messaging identifier to the router, such as a name, number, or combination thereof, and assigning an instant messaging identifier corresponding to each user. Using the message router, electronic data is gathered from the building equipment, packetized into data packets, encapsulated into an instant message, and transmitted as an instant message to the instant message server where it is routed to the intended authorized user. The data gathering and transmission can be performed on an unsolicited (i.e. automatic) basis, or may be performed in response to a solicitation or request from a user.

A system is provided for remotely monitoring building equipment at different sites. The system includes at least one item of building equipment, a router communicably connected to the at least one item of building equipment, the router having a microprocessor executing a memory storing computer program including computer instructions ("software") for polling connected building equipment, receiving data from connected building equipment, converting the data, packetizing the converted data, encapsulating the packetized data into an instant message, and routing the instant message to an instant messaging server. The instant messaging server is communicably connected to the router, and is configured to receive an instant message from the router and to transmit the instant message to at least one remotely located interface.

An advantage of the present invention is that a contractor or other authorized IM user can remotely access the IM server and be linked with the router and connected building equipment for remote gathering and monitoring of data from the equipment.

Another advantage is that the use of instant messaging software and a dedicated IM server permits data transfer from networked building equipment located behind a firewall to remotely located users, without the need for a separate connection to the computer network.

Another advantage of the present invention is that the transmission of data packets using instant messaging technology provides a quick and easy way for building information to be accessed.

Yet another advantage of the present invention is that it permits a remotely located contractor to remotely monitor numerous pieces of networked, firewall-protected equipment, including equipment located at different geographical sites, without the need for a separate connection to the computer network(s) controlling the building equipment.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The foregoing and other features of the present invention will be more readily apparent from the following detailed description and drawings of the illustrative embodiments of the invention in which.

Wherever possible, the same reference numbers will be used throughout the drawings to refer to the same or like parts.

DETAILED DESCRIPTION OF THE INVENTION

A system is provided to facilitate communication between networked building equipment in a building automation system (BAS) and a remotely located user such as a service contractor. Each item or piece of building equipment in the BAS is connected to a router that is registered on an IM server. Each such registered router is matched or linked to a list of preselected authorized users or "buddies" that have permission to access information from the router. Authorized users include, for example, service contractors, facilities managers, utility providers, manufacturing personnel, and other remotely located people who are granted permission to access data from the equipment through the IM server.

Figure 1:
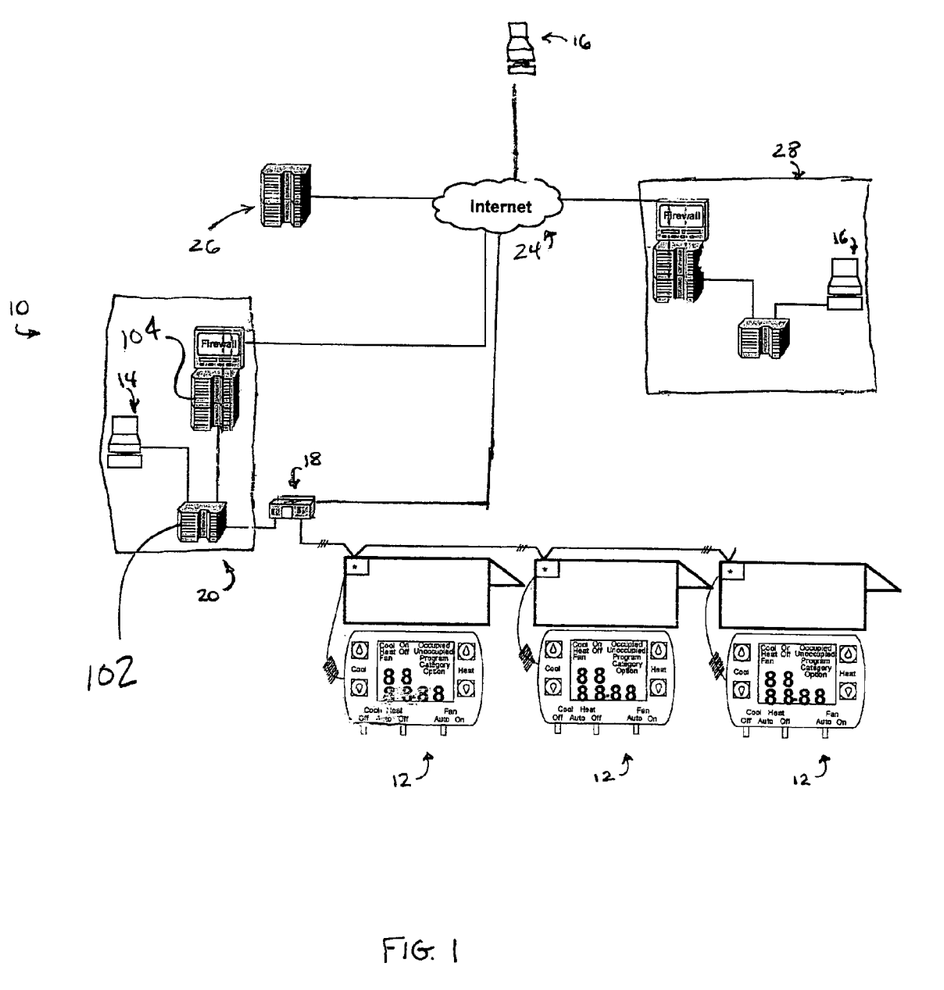
FIG. 1 shows a diagram of a first embodiment of a system implementing various aspects of the invention.

FIG. 1 illustrates a block diagram of one embodiment of a system 10 for the monitoring of equipment 12, preferably HVAC equipment of a building automation system (BAS) or other similar type of control system for HVAC equipment. In the embodiment illustrated, the system 10 can be monitored by a local user using a local computer interface 14, which preferably is part of the building automation system, and by a remotely located user using a remotely located interface 16. The building equipment 12 is communicably linked or connected to a router 18 to permit electronic signals and data from the building equipment 12 to be sent to the router 18. The router 18 includes a microprocessor and executable code (software) for data gathering, data conversion and formatting, data packetizing, packet encapsulation, and message routing for gathering and conveying data from the connected building equipment 12. Preferably, the microprocessor of the router 18 executes Linux as its operating system, and executes Jabber™ as the instant messaging software. However, any suitable operating system and compatible instant messaging software can be used. In another embodiment of the present invention, Internet relay chat (IRC) software, ICQ software or other instant messaging software can be used.

In the embodiment of the system shown in FIG. 1, the router 18 is communicably connected to a local data network 20, preferably an Ethernet hub. The local data network 20 may include a local server 102, a local user interface device 14 such as a PC, laptop, PDA, or other computerized communication device, and a gateway 104 (that may be protected by a firewall) for connection to a wide area network 24. The gateway 104 can be incorporated in the local server 102 or the gateway 104 can be provided separate from the local server, for example by software residing on and executed by a microprocessor of a connected PC or other communication device. The wide area network 24 is preferably the Internet, but can be any suitable computer network.

Optionally, the router 18 may include a gateway for direct connection to the wide area network 24, obviating the need for gateway 104 in the local area network 20. The system further includes an IM server 26 communicably connected by the wide area network 24 to the local data network 20 or directly to the router 18. The IM server 26 is further connected by the wide area network 24 to a remote data network 28 to enable remote users on the remote network 28 to exchange instant messages with the router 18 through the IM server 26. The remote data network 28 may comprise a remote server and corresponding network, or may simply comprise a remote user interface device 16 such as a PC, laptop, PDA, or other computerized communication device that can access the wide area network 24. The remote network 28 can permit remote users to interface with the IM server 26 through a gateway to the wide area network 24, which gateway is preferably firewall protected. The IM server 26 thus enables instant message-based communication between a remote user (or local user) and a router 18.

The IM server 26 and router 18 together control the access of local and remotely located users to building automation data gathered from each unit of building equipment 12. The router 18 can connect to multiple items of building equipment 12, preferably as many as 254 separate items. It being understood that the number of equipment devices supported by router 18 depends on configuration of the router 18. Preferably, the router 18 uses a MODBUS Remote Telemetry Unit (RTU) that allows connection of up to 255 devices on a MODUS network, with the router 18 preferably residing at address number 255 of the MODBUS port. When first connected to the MODBUS network for the equipment, the router 18 preferably scans all available addresses, and stores the highest address found as the last device on the MODBUS network. The router 18 also stores a unique address, and preferably a unique profile with building equipment and automation information such as equipment type, make, model, specifications, and other information associated with each item of connected building equipment. The router 18 regularly scans its communication bus for newly added equipment, newly deleted equipment, as well as for alarms generated by any connected piece of building equipment. Once detected, each piece of building equipment preferably retains its registered address, and in any event, retains its unique profile so as to enable reliable identification of each piece of connected equipment 12 by the router 18, the system 10, and by users.

The router 18 includes a microprocessor executing software to scan or poll the connected equipment 12 to gather equipment information. In the case of heating, ventilation and air conditioning building equipment, the equipment information can include alarms and faults, operational status (such as on, off, standby), mode and settings (cooling, heating, fan only, selected temperature), operational parameters (such as compressor speed, fan speed, thermostat setting, refrigerant level, temperature and pressure), and historical parameters (run time, downtime, maintenance), and other data relevant to the connected equipment 12. Preferably, the scanning or polling is automatically performed by the router 18 at least once every five minutes. However, the intervals of time between polling may be selected or altered by users, system administrators, or other authorized personnel to a desired or appropriate time period.

Depending upon the type of building equipment, data from the building equipment may require conversion or formatting to make it suitable for packetizing and encapsulating into an instant message. Preferably, the router 18 executes all necessary data conversion and/or formatting to enable transmission of gathered data as a data packet encapsulated in an instant message. For example, in one embodiment, data gathered from the equipment 12 is provided to the router 18 in hexadecimal format. In this embodiment, the router 18 converts the data from the hexadecimal format provided by the equipment to ASCII format or protocol, it being understood that the data may be converted to one or more intermediate formats before being converted to an ASCII format or another final format that can be packetized and encapsulated into an instant message. The data in the ASCII format or other final format or protocol is then packetized by the router 18, and is next encapsulated by the router 18 into an IM communication packet that can be incorporated into an instant message for routing to an authorized user logged on to the IM, server 26. While the use of hexadecimal and ASCII formats and protocols is preferable, other data formats and conversions can be used without departing from the scope of the invention.

Each data packet preferably includes an accuracy check feature that allows a data recipient to verify the integrity of the data transmitted. For example, each packet may contain a cyclic redundancy check ("CRC") value that is calculated to catch transposition errors and other errors resulting from packetizing and encapsulation of the data. Preferably, the accuracy check feature is a 16-bit CRC, although other accuracy check methods and systems known to those skilled in the art may be incorporated without departing from the spirit of the present invention.

As further described below with respect to a first embodiment of the method of the present invention, the router 18 may act as a pass-through router 18 and transmit to the remote user the data that is being gathered automatically, i.e. unsolicited, by the router 18 from the MODBUS network. As described below with respect to a second embodiment of the method of the present invention, the router 18 may operate in an interactive mode to receive solicited instant messages from a user. In that embodiment, the router 18 receives an IM containing a packetized data request from the user, the router 18 reads the request, polls or solicits particular items of connected building equipment 12 for the data specified in the request, gathers the data and packetizes it, encapsulates the packet into an IM and transmits the IM to an IM server 26 for routing to the requesting user, and possibly to other users designated in the request or identified on the IM list.

To permit a remote user to interface with the system 10, the router 18 has to remain logged onto the IM server 26. If the router connection to the IM server 26 is lost, the router 18 will automatically attempt to reconnect to the IM server 26 until a successful connection to the IM server 26 is established, either directly or through the local network 20. The router 18 may poll remote users to determine if a user is logged on a remote computer interface 16 with an instant messaging service provider through an appropriate IM application or routine. The remote user utilizes the remote interface 16 of the remote data network 28 to communicate with the IM server 26 through a gateway to the Internet 24. The gateway will typically be provided by a service provider to which the user has subscribed and allows access to the IM server 26 after the user has logged in. Alternatively, the gateway is provided by non-subscription IM software such as Jabber™ that provides a gateway to the wide area network 26 and IM server 26. The IM server 26 thus allows exchange of IM messages between a remote user on a remote interface device 16 and the message router 18.

The submission of solicitations or requests from remotely located interface 16 involves converting and/or re-formatting of data for transmission as a packet encapsulated in an IM message. In one embodiment involving data gathering and transmission in response to a solicitation from a remotely located interface 16, the user's solicitation or request of the router 18 originates as a ASCII-based message that is packetized and encapsulated into an IM message. The IM is sent to the IM server 26, which server 26 sends the IM message to the router 18. Router 18 then converts or reformats the request as necessary for packetizing, such as from ASCII to MODBUS RTU compatible format, and sends the converted request to an equipment device 12 on the MODBUS network. The router 18 receives the requested data from the equipment 12, converts or reformats the data as necessary for packetizing, such as from MODBUS RTU compatible format to an ASCII or other IM compatible format, and packetizes and encapsulates the data and transmits it through the IM server 26 to the requesting user.

For local user access (i.e. from local devices 14) to data gathered from the building equipment 12, the router 18 preferably uses a MODBUS TCP/IP network configuration on the Ethernet port of the local server 102. In this mode, the router 18 acts as a slave on the Ethernet port waiting to be polled by the local user interface 14 through the local server 102. Once polled, the router 18 acts as a pass-through to allow data to pass from the equipment 12 through the router 18 to the local data network 20 where it may be accessed by users.

Figure 2:
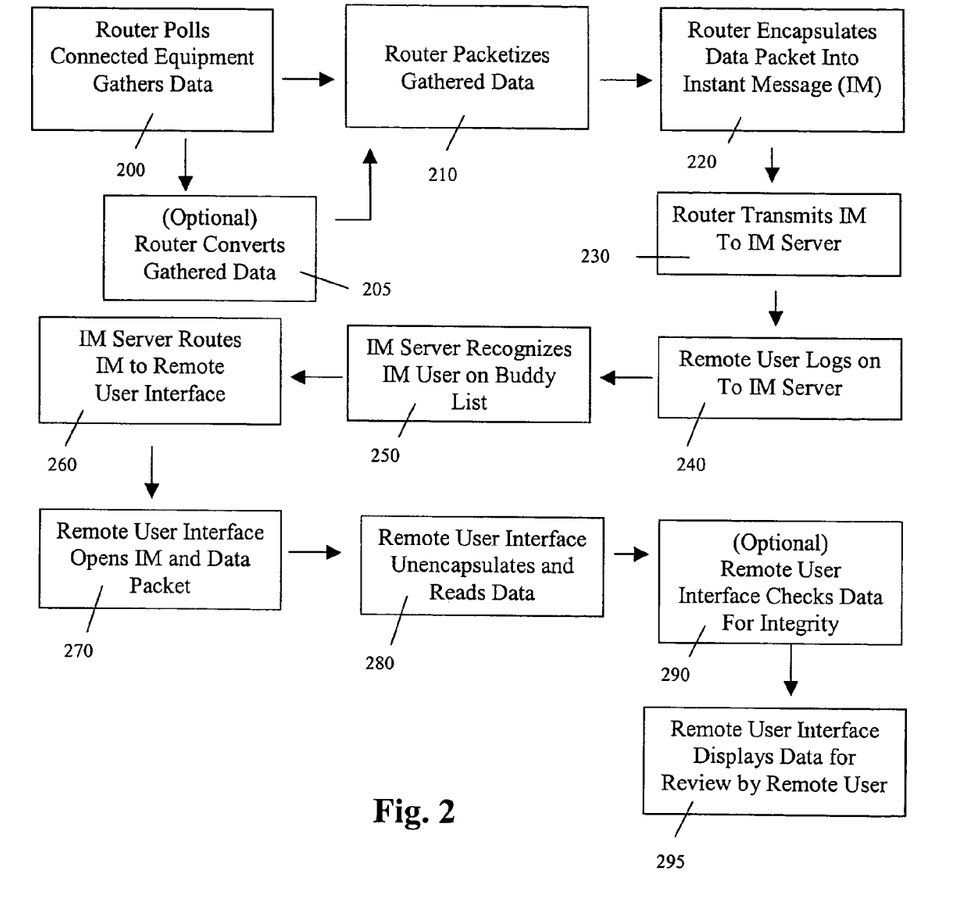
FIG. 2 is a flow chart showing one embodiment of the method of the present invention.

A first embodiment of the present invention is illustrated in FIG. 2. In step 200, the router 18 automatically polls the connected building equipment 12. Preferably, the router 18 automatically polls each piece of connected building equipment 12 at preselected intervals and gathers alarms, faults, and other preselected data. More preferably, the router 18 automatically polls only for alarms and faults. In optional step 205, the gathered data is converted to a format that is compatible with instant messaging, such as ASCII, as previously described. In step 210, the gathered data is packetized by the router 18. In step 220, the packetized data is encapsulated into an IM message. In step 230, the IM message is transmitted by the router 18 to the IM server 26, such as through a gateway connection to a wide area network 24. In this embodiment, when registered building equipment is operated, a continuous communication link is established with the IM server 26 through the router 18 communicably connected to the equipment 12. In step 240, remote users log on to the IM server 26 using a remote interface 16, whether directly through a gateway provided in the remote device 16 or through a remote server provided in remote network 28. The remote interface 16 or remote network 28 execute software that is compatible with the software of the router 18 to enable the remote interface 16 or remote network 28 to communicate with the IM server, receive IM messages, open IM messages and attached or encapsulated data packets, optionally verify data integrity, and to visually display the data, preferably in numeric, tabular, and graphic display formats. In step 250, logged on users are compared to a user list by the IM server 26. In step 260, provided that the comparison of step 250 shows that the logged on user is listed, the IM server 26 routes the IM message with the encapsulated packetized data to the remote network 28 or directly to the remote user interface 16. In step 270, the remote user interface 16 opens the IM message and the attached data packet. In step 280, the remote user interface 16 unencapsulates the packet and reads the data. In optional step 290, the remote user interface 16 checks the data for integrity, such as by performing a cyclic redundancy check calculation. Finally, in step 295, the remote user interface 16 displays the data for review by the remote user. Although illustrated as being performed by the remote interface 16, each of the steps 270 through 280 can be alternatively performed by any component in the remote network 28, with the unpacketized data sent to the remote interface 16 for visual display to the remote user. In the first embodiment, the process of gathering and submitting instant messages by the router 18 is referred to as "unsolicited" since the router 18 automatically polls equipment 12 for data and sends the data in an IM message, without the need for submission of a request by a remote user.

Figure 3:
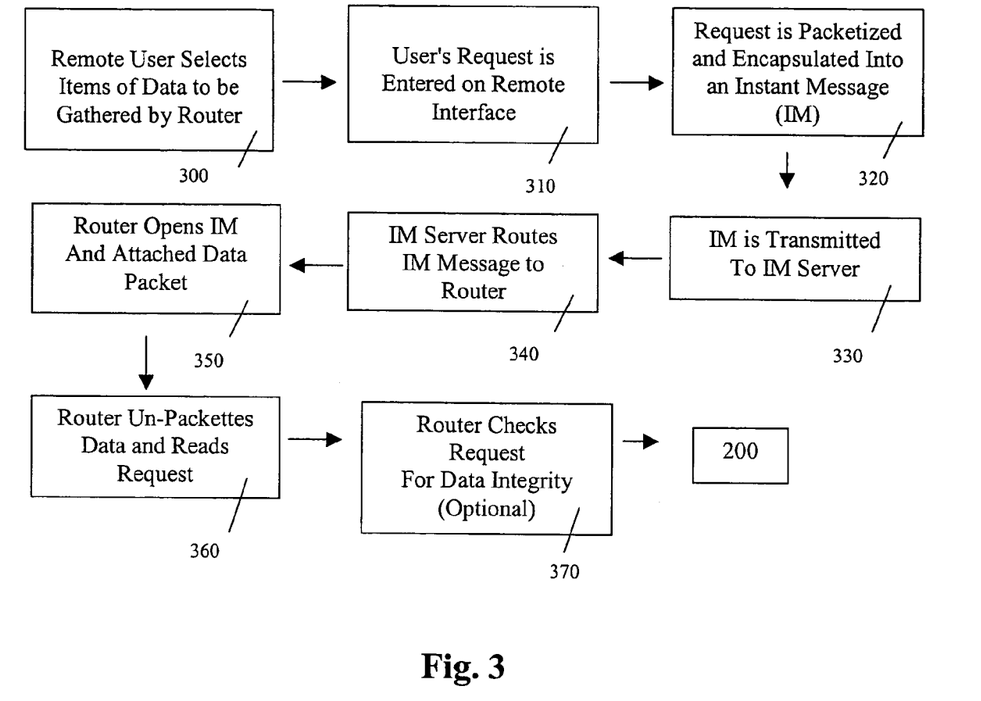
FIG. 3 is a flow chart showing a second embodiment of the method of the present invention.

A second alternative embodiment is illustrated in FIG. 3. In this embodiment, the invention includes features that permit solicitation by a remote user to direct the polling of specific data from particular items of building equipment 12 based upon a request submitted by a remote user. In this embodiment, the remote user interface 16 or remote network 28 includes software that allows a remote user to select a particular item or items of data to be gathered from one or more items of specific building equipment. In step 300, the user select items of data to be gathered by the router 18—the user' selection is hereafter referred to as a request. In step 310, the user's request is entered into the remote interface device 16. In step 320, the request is packetized and encapsulated into an IM message. This step may is performed by software that may reside on the remote device 16 or in a remote network 28. Step 330 involves transmission of the IM message with the packetized request to an IM server 26 through a gateway to the wide area network 24. Again, the gateway may be provided in IM software residing on the remote interface 16, or alternatively in a remote network 28 connected to the remote interface 16. In step 340, the IM server 26 routes the IM message to the router 18 connected to the specified building equipment 12. Step 340 implicitly involves the step of the IM server reviewing the source of the IM message to ensure that the sender is an authorized user, such as by comparing the user network identification to a user list on the server. If the requesting user is authorized on a user list corresponding to the network identification for the router 18 to which the IM message is addressed, the IM message is routed to the router 18. In step 350, software of the router 18 then opens the encapsulated, packetized data. In step 360, the router 18 unpacketizes the request and reads and/or interprets the request. In optional step 370, the router checks the request for data integrity, such as by running a cyclic redundancy check calculation. If the request is uncorrupted, the software of the router 18 instructs the microprocessor of the router 18 to gather the requested data from the specified item or items of building equipment 12. As previously described in step 200-295, the router 18 then polls the equipment 12, gathers the requested data, packetizes it, and encapsulates it into an instant message for return to the remote user, as described heretofore in the first embodiment of the method.

Notably, the features of the first and second embodiments of the methods of the present invention can be combined to permit automatic notification of alarms, faults, shutdowns, and other critical operating parameters of the building equipment 12, while also allowing remote users to select, request, and obtain data concerning specific operating parameters of particular items of building equipment 12 using instant messaging.

The invention may include features to conserve system memory. For example, data gathered by the router 18 for connected equipment 12 is overwritten when the equipment 12 is next polled by the router 18. Additionally, packetized data sent to the IM server 26 can be automatically deleted when the next IM message containing packetized data for the same equipment 12 is sent. Alternatively, IM messages with data packets may be automatically retained by a system component having storage capacity, such as by the IM server 26, local server 102, remote interface 16 or router 18, for a preselected period of time or up to a preselected number IM messages. Preferably, the preselected period of time to retain IM messages, and/or the preselected number of stored IM messages, can be adjusted by system administrators, local users, and remote users. Lastly, IM messages retrieved by a remote user can be automatically deleted from any or all of the components of the system when the next IM message with packetized data for the same equipment 12 is sent.

The system and method further provide for controlled access by users to avoid unauthorized receipt and review of data. Controlled access includes the authorization of users, such as through user lists, as well as the assignment of secure network identification numbers. Authorized user or "buddy" lists, passwords, and other common secure access features provided by IM software and services can be used to provide additional security. For example, the Jabber™ IM software includes a protocol for controlling the addition and deletion of users, as well as authenticating users. In a preferred embodiment, each router 18 and each authorized user has a unique network identification, and each item of building equipment has a system address assigned and recorded by the router 18. The network identifications are included in user lists created for authorized users. Preferably, access to each user's IM account, as well as access to the router 18, is password protected. In this embodiment, whenever the router 18 sends an IM with packetized and encapsulated data, whether polled automatically or in response to a request from a user, the router 18 connects to the IM server 26 and verifies the network ID and password provided by the requesting user against the list of authorized identification numbers. Once verified, the router 18 will reply to IM messages from authorized users by providing IM messages containing packetized and encapsulated data from the connected building equipment 12. Preferably, the unique profile created for each piece of building equipment 12 is also included in the data packet.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of remotely monitoring building equipment comprising:
   providing at least one item of building HVAC equipment communicably linked to a router, the router being communicably linked to an instant messaging server;
   providing at least one remotely located interface, the at least one remotely located interface being communicably linked to the instant messaging server;
   gathering data from the at least one item of building HVAC equipment with the router;
   packetizing the gathered building equipment data into at least one data packet;
   encapsulating the at least one data packet into an instant message; and
   transmitting the encapsulated at least one data packet in the instant message from the router to the at least one remotely located interface through the instant messaging server.

2. The method of claim 1, further comprising assigning an instant messaging identifier to the router.

3. The method of claim 2, further comprising assigning an instant messaging identifier to a user at the at least one remotely located interface.

4. The method of claim 3 further comprising checking an authorized user list of the router for the instant messaging identifier of a user at the at least one remotely located interface.

5. The method of claim 3 further comprising checking an authorized user list of the at least one remotely located interface for the messaging identifier of the router.

6. The method of claim 1, wherein the step of packetizing the data into at least one data packet further comprises converting the data prior to packetizing the data.

7. The method of claim 1, further comprising unencapsulating the encapsulated data packet at the at least one remotely located interface and displaying the unencapsulated data at the at least one remotely located interface.

8. The method of claim 1, wherein the step of gathering data from the at least one item of HVAC building equipment comprises gathering at least one of alarm data, faults data, operational status data, mode data, settings data, operational parameters, and historical parameters.

9. The method of claim 8, wherein the at least one item of HVAC building equipment is ventilation equipment.

10. The method of claim 9, wherein the operational parameters and historical parameters comprise at least one of compressor speed, fan speed, thermostat setting, refrigerant level, refrigerant temperature, refrigerant pressure, run time, downtime, and maintenance information.

11. The method of claim 1, wherein the step of gathering data from the at least one item of building HVAC equipment includes polling building equipment automatically at preselected intervals of time.

12. The method of claim 1, wherein the step of gathering data from the at least one item of building HVAC equipment is performed in response to a request submitted by a user through the instant messaging server to the router.

13. The method of claim 12, wherein the request is packetized and encapsulated into an instant message that is sent to the instant messaging server where it is routed to the router connected to the building equipment.

14. A system for remotely monitoring building HVAC equipment, the system comprising:
    at least one item of building HVAC equipment;
    a router communicably connected to the at least one item of building HVAC equipment to receive data from the at least one item of building HVAC equipment, the router having a microprocessor and a memory storing computer program executable by the microprocessor, the computer program comprising computer instructions for gathering data from the connected at least one item of building HVAC equipment, converting the data, packetizing the converted data, and encapsulating the packetized data into an instant message; and
    an instant messaging server communicably connected to the router, the instant messaging server being configured to receive an instant message from the router and to transmit the instant message to at least one remotely located interface.

15. The system of claim 14, wherein the at least one item of building HVAC equipment has an assigned unique electronic address to permit electronic identification of the equipment, and wherein the assigned unique electronic address further comprises a portion of an electronic profile for the at least one item of building HVAC equipment.

16. The system of claim 14, wherein the at least one item of building HVAC equipment is ventilation equipment.

17. The system of claim 16, wherein the data gathered from the at least one item of building HVAC equipment comprises at least one of alarms data, faults data, operational status data, mode data, settings data, operational parameters, and historical parameters.

18. The system of claim 17, wherein the operational parameters and historical parameters comprise at least one of compressor speed, fan speed, thermostat setting, refrigerant level, refrigerant temperature, refrigerant pressure, run time, downtime, and maintenance information.

19. The system of claim 14, wherein the computer program executable by the microprocessor comprising computer instructions for gathering data from the connected at least one item of building HVAC equipment further comprises computer instructions for automatically gathering data at preselected intervals of time.

20. The system of claim 14, wherein the computer program executable by the microprocessor comprising computer instructions for gathering data from the connected at least one item of building HVAC equipment further comprises computer instructions for gathering data in response to a request received in an instant message submitted by a user.

21. The system of claim 14, further comprised of at least one remotely located interface communicably connected to the message router through the instant messaging sewer, the remotely located interface having a microprocessor and a memory storing computer program executable by the microprocessor, the computer program comprising computer instructions for receiving packetized data encapsulated in an instant message created by the router, unpacketizing and unencapsulating the data, and displaying the data on the remotely located interface.

22. The system of claim 14, further comprised of at least one user interface communicably connected to the message router through the instant messaging server, the user interface having a microprocessor and a memory storing computer program executable by the microprocessor, the computer program comprising computer instructions for receiving a request for data to be gathered by the router, packetizing and encapsulating the request into an instant message, sending the instant message to the router through the instant messaging server, receiving a responsive instant message from the router containing packetized data encapsulated in an instant message created by the router, unpacketizing and unencapsulating the data, and displaying the data on the user interface.

\* \* \* \* \*

UNITED STATES PATENT AND TRADEMARK OFFICE
CERTIFICATE OF CORRECTION

| | | |
|---|---|---|
| PATENT NO. | : 7,640,066 B2 | |
| APPLICATION NO. | : 10/772620 | |
| DATED | : December 29, 2009 | |
| INVENTOR(S) | : Rayburn et al. | |

It is certified that error appears in the above-identified patent and that said Letters Patent is hereby corrected as shown below:

Column 12, Line 3, "sewer" should read --server--

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,640,066 B2
APPLICATION NO. : 10/772620
DATED : December 29, 2009
INVENTOR(S) : Rayburn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1666 days.

Signed and Sealed this

Ninth Day of November, 2010

David J. Kappos
*Director of the United States Patent and Trademark Office*